United States Patent
Osawa (10) Patent No.: US 10,924,037 B2
(45) Date of Patent: Feb. 16, 2021

(54) VIBRATION MOTOR THAT PREVENTS RESONANCE OF CONTACT MEMBER, AND ELECTRONIC APPARATUS

(71) Applicant: CANON KABUSHIKI KAISHA, Tokyo (JP)

(72) Inventor: Kazuharu Osawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 557 days.

(21) Appl. No.: 15/782,437

(22) Filed: Oct. 12, 2017

(65) Prior Publication Data

US 2018/0109205 A1    Apr. 19, 2018

(30) Foreign Application Priority Data

Oct. 17, 2016   (JP) .............................. JP2016-203534

(51) Int. Cl.
*H02N 2/00* (2006.01)
*G02B 7/08* (2021.01)
*H02N 2/02* (2006.01)

(52) U.S. Cl.
CPC ............. *H02N 2/0045* (2013.01); *G02B 7/08* (2013.01); *H02N 2/001* (2013.01); *H02N 2/002* (2013.01); *H02N 2/02* (2013.01); *H02N 2/026* (2013.01)

(58) Field of Classification Search
CPC ........ H02N 2/026; H02N 2/004; H02N 2/103; H02N 2/04; H02N 2/0055; H02N 2/002;
(Continued)

(56) References Cited

U.S. PATENT DOCUMENTS 6,218,767 B1 *   4/2001   Akada .................... H02N 2/004
                                                  310/323.02
7,696,670 B2     4/2010   Sakamoto
(Continued)

FOREIGN PATENT DOCUMENTS

CN       101325384 A      12/2008
CN       104753390 B       4/2018
(Continued)

OTHER PUBLICATIONS

Office Action issued in Chinese Appln. No. 201710975364.5 dated Sep. 4, 2019. English translation provided.
(Continued)

*Primary Examiner* — J. San Martin
(74) *Attorney, Agent, or Firm* — Rossi, Kimms & McDowell LLP (57) ABSTRACT

A small-sized vibration motor. The vibration motor includes a vibrator having a piezoelectric element, a contact member brought into friction contact with the vibrator, and a fixing member to which the contact member is fixed. The vibrator and the contact member are moved relative to each other in a driving direction by high-frequency vibration of the piezoelectric element. The contact member includes a sliding portion brought into friction contact with the vibrator when the vibrator and the contact member are moved relative to each other in the driving direction, and fixed portions via which the contact member is fixed to the fixing member. The fixed portions are formed at respective locations alongside the sliding portion in a second predetermined direction orthogonal to the first predetermined direction, and also inward of opposite ends of the contact member in the first predetermined direction.

8 Claims, 10 Drawing Sheets

(58) Field of Classification Search
CPC .. H01L 41/0913; H01L 41/042; H01L 41/053
See application file for complete search history.

(56) References Cited

U.S. PATENT DOCUMENTS

| | | | |
|---|---|---|---|
| 9,827,593 B2 | 11/2017 | Yamamoto | |
| 10,247,902 B2* | 4/2019 | Noguchi | G02B 7/04 |
| 2011/0031847 A1* | 2/2011 | Sakamoto | H02N 2/04 |
| | | | 310/323.02 |
| 2014/0285066 A1* | 9/2014 | Yamamoto | H02N 2/026 |
| | | | 310/323.02 |
| 2014/0293463 A1* | 10/2014 | Yamanaka | H02N 2/004 |
| | | | 359/824 |
| 2016/0301329 A1 | 10/2016 | Yamasaki | |
| 2017/0371125 A1* | 12/2017 | Ninomiya | H02N 2/0055 |
| 2018/0175747 A1* | 6/2018 | Tomura | H02N 2/043 |
| 2020/0038913 A1* | 2/2020 | Rosenkranz | H02N 2/026 |

FOREIGN PATENT DOCUMENTS

| | | |
|---|---|---|
| JP | 109215348 A | 8/1997 |
| JP | 2006106070 A | 4/2006 |
| JP | 2015220911 A | 12/2015 |

OTHER PUBLICATIONS

Office Action issued in Japanese Appln. No. 2016-203534 dated Oct. 6, 2020.

* cited by examiner

VIBRATION MOTOR THAT PREVENTS RESONANCE OF CONTACT MEMBER, AND ELECTRONIC APPARATUS

BACKGROUND OF THE INVENTION

Field of the Invention

The present invention relates to a vibration motor that prevents resonance of a contact member, and an electronic apparatus, and more particularly to a vibration motor that is used in a lens barrel e.g. of an image pickup apparatus which is one of electronic apparatuses.

Description of the Related Art

A vibration motor (also referred to as an ultrasonic motor) is a motor that is relatively small-sized, but has features of high output performance and quietness, and for example, the vibration motor is used as a lens driving motor for an interchangeable lens in a single-lens reflex camera which is one of image pickup apparatuses.

The vibration motor includes a vibrator, and a contact member which is brought into friction contact with the vibrator, and if the contact member resonates due to the vibration of the vibrator, unnecessary vibrations and untoward noise are sometimes generated. Therefore, when driving the vibration motor, it is desirable to prevent resonance of the contact member.

To prevent resonance of the contact member, there has been proposed e.g. a vibration motor which is designed to prevent the driving frequency of driving the vibration motor from becoming equal to the resonance frequency of the friction member (contact member) to thereby suppress resonance of the contact member (see e.g. Japanese Laid-Open Patent Publication (Kokai) No. H09-215348).

On the other hand, examples of the vibration motor include a so-called linear drive-type vibration motor. In this linear drive-type vibration motor, opposite ends of the friction member (contact member) are fixed, and as a result, the contact member has resonance modes of out-of-plane bending vibration, in-plane bending vibration, and torsional vibration (see e.g. Japanese Laid-Open Patent Publication (Kokai) No. 2015-220911).

To design such a linear drive-type vibration motor such that the driving frequency and the resonance frequency of the contact member are prevented from becoming equal to each other, since the opposite ends of the contact member are fixed, the shape of the contact member has a low degree of freedom in design, and especially, it is difficult to reduce the thickness of the contact member. Further, since it is necessary to form fixed portions on the opposite ends of the contact member, the whole length of the contact member is increased, which increases the size of the vibration motor.

SUMMARY OF THE INVENTION

The present invention provides a small-sized vibration motor and an electronic apparatus.

In a first aspect of the present invention, there is provided a vibration motor including a vibrator having a piezoelectric element, a contact member which is brought into friction contact with the vibrator, and a fixing member to which the contact member is fixed, the vibration motor causing the vibrator and the contact member to move relative to each other in a first predetermined direction, by high-frequency vibration of the piezoelectric element, wherein the contact member comprises a sliding portion which is an area brought into friction contact with the vibrator when the vibrator and the contact member are caused to move relative to each other in the first predetermined direction, and a fixed portion via which the contact member is fixed to the fixing member, and wherein the fixed portion is formed at a location alongside the sliding portion in a second predetermined direction orthogonal to the first predetermined direction, and also inward of an end of the contact member in the first predetermined direction.

In a second aspect of the present invention, there is provided a vibration motor comprising a vibrator, a contact member which is brought into contact with the vibrator, the vibrator and the contact member being caused to move relative to each other by high-frequency vibration of the vibrator, and a fixing member to which the contact member is fixed, wherein the contact member has a flat plate shape, and includes a contact area which is brought into contact with the vibrator when the contact member moves relative to the vibrator, and a fixed portion which is fixed to the fixing member, and wherein the fixed portion is formed at a location alongside the contact area in a direction orthogonal to a direction in which the vibrator and the contact member are brought into contact and to a relative movement direction in which the vibrator and the contact member move relative to each other.

In a third aspect of the present invention, there is provided an electronic apparatus comprising a vibration motor, and a driven member that is driven by driving of the vibration motor, the vibration motor including a vibrator having a piezoelectric element, a contact member which is brought into friction contact with the vibrator, and a fixing member to which the contact member is fixed, the vibration motor causing the vibrator and the contact member to move relative to each other in a first predetermined direction, by high-frequency vibration of the piezoelectric element, wherein the contact member includes a sliding portion which is an area brought into friction contact with the vibrator when the vibrator and the contact member are caused to move relative to each other in the first predetermined direction, and a fixed portion via which the contact member is fixed to the fixing member, and wherein the fixed portion is formed at a location alongside the sliding portion in a second predetermined direction orthogonal to the first predetermined direction, and also inward of an end of the contact member in the first predetermined direction.

In a fourth aspect of the present invention, there is provided an electronic apparatus comprising a vibration motor, and a driven member that is driven by driving of the vibration motor, the vibration motor including a vibrator, a contact member which is brought into contact with the vibrator, the vibrator and the contact member being caused to move relative to each other by high-frequency vibration of the vibrator, and a fixing member to which the contact member is fixed, wherein the contact member has a flat plate shape, and includes a contact area which is brought into contact with the vibrator when the contact member moves relative to the vibrator, and a fixed portion which is fixed to the fixing member, and wherein the fixed portion is formed at a location alongside the contact area in a direction orthogonal to a direction in which the vibrator and the contact member are brought into contact and to a relative movement direction in which the vibrator and the contact member move relative to each other.

According to the present invention, it is possible to reduce the size of the contact member, and thereby reduce the vibration motor itself.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
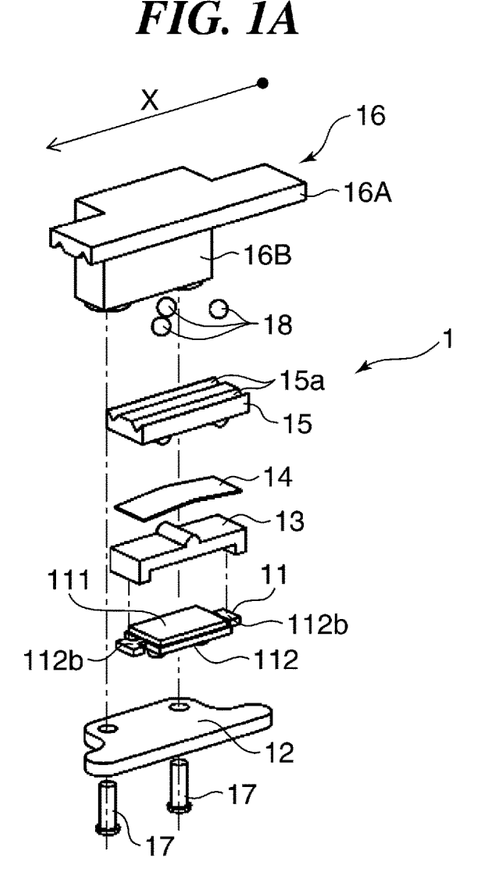
FIGS. 1A to 1D are diagrams useful in explaining a vibration motor according to a first embodiment of the present invention.
Figure 1B:
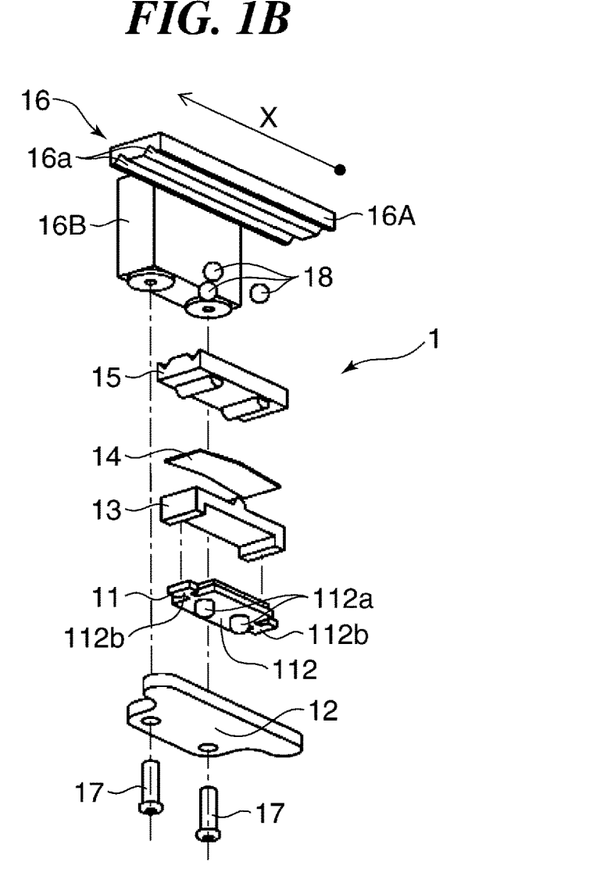
Figure 1C:
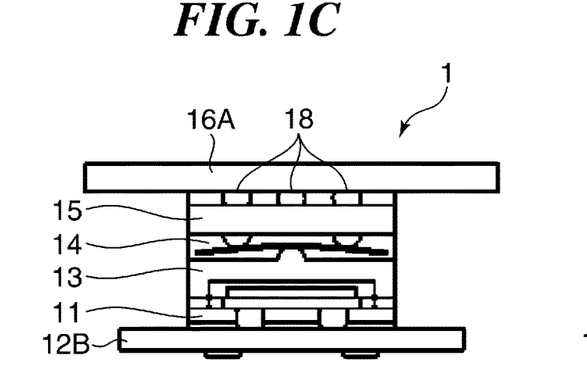
Figure 1D:
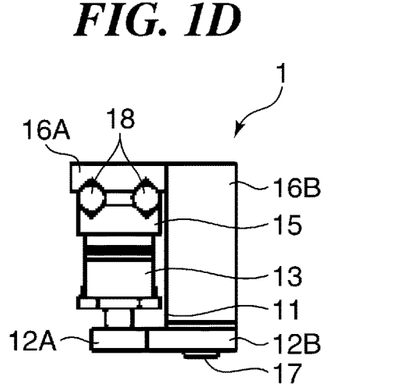

FIGS. 1A to 1D are diagrams useful in explaining a vibration motor according to a first embodiment of the present invention. FIG. 1A is an exploded perspective view of the vibration motor, as viewed from one direction, whereas FIG. 1B is an exploded perspective view of the vibration motor, as viewed from another direction. FIG. 1C is a front view of the vibration motor, and FIG. 1D is a side view of the vibration motor.

The illustrated vibration motor, denoted by reference numeral 1, includes a vibrator 11, a friction member 12 as a contact member, a vibrator holding member 13, a pressurizing member 14, a guided member 15, a fixing member 16, fastening members 17, and rolling members 18.

The vibrator 11 includes a piezoelectric element 111 having a plate shape, and the piezoelectric element 111 has an elastic member 112, having a plate shape, attached to one surface thereof. Further, as shown in FIG. 1B, the elastic member 112 is formed with two protrusions 112a each protruding downward, and is formed with held portions 112b extending outward from respective opposite sides thereof.

The piezoelectric element 111 is made e.g. of PZT (lead zirconate titanate), and the elastic member 112 is made e.g. of metal, such as stainless steel. When a high-frequency AC voltage is applied to the piezoelectric element 111, the vibrator 11 performs vibration (high frequency vibration), and tip ends of the protrusions 112a each perform elliptic motion.

The vibrator holding member 13 is adhesively fixed to the held portions 112b, and holds the vibrator 11 while preventing suppression of vibration of the vibrator 11. The pressurizing member 14 is e.g. a leaf spring, and pressurizes the vibrator holding member 13 using a reaction force of elastic deformation of its own to thereby bring the protrusions 112a into pressure contact with the friction member 12.

The guided member 15 sandwiches the pressurizing member 14 between the vibrator holding member 13 and itself to thereby cause elastic deformation of the pressurizing member 14. Further, the guided member 15 is formed with two guide grooves 15a extending in a driving direction (X direction in FIGS. 1A and 1B) of the vibration motor 1. The fixing member 16 includes a first fixing area part 16A and a second fixing area part 16B which is integrally formed with the first fixing area part 16A. Further, the first fixing area part 16A is formed with two guide grooves 16a extending in the driving direction (X direction) of the vibration motor 1, similar to the guided member 15.

The friction member 12 has a flat plate shape, and as shown in FIGS. 1C and 1D, includes a first friction area part 12A in which a sliding portion 12a, referred to hereinafter, is defined, and a second friction area part 12B which is integrally formed with the first friction area part 12A. The second friction area part 12B is formed with a pair of fixed portions 12b (see FIG. 5A). The first friction area part 12A and the second friction area part 12B are provided on the same plane. Further, screws 17 as fastening members are inserted through the fixed portions 12b, respectively, whereby the second friction area part 12B of the friction member 12 is fixed to the second fixing area part 16B of the fixing member 16.

Note that as shown in FIGS. 1A to 1D, balls as the rolling members 18 are sandwiched between the guide grooves 15a formed in the guided member 15 and the guide grooves 16a formed in the fixing member 16, and the guided member 15 is held in a manner movable only in the driving direction (X direction) with respect to the fixing member 16.

When the vibrator 11 vibrates to cause the protrusions 112a to perform elliptic motion, a drive force is generated in the driving direction (X direction) on contact surfaces between the protrusions 112a and the friction member 12. At this time, the vibrator 11, the vibrator holding member 13, the pressurizing member 14, and the guided member 15 are linearly driven in unison in the driving direction (X direction) relative to the friction member 12. That is, the vibrator 11 and the friction member 12 are moved relative to each other.

Here, the operation of the vibration motor 1, shown in FIGS. 1A to 1D, will be described while being compared with a conventional vibration motor 3.

Figure 2A:
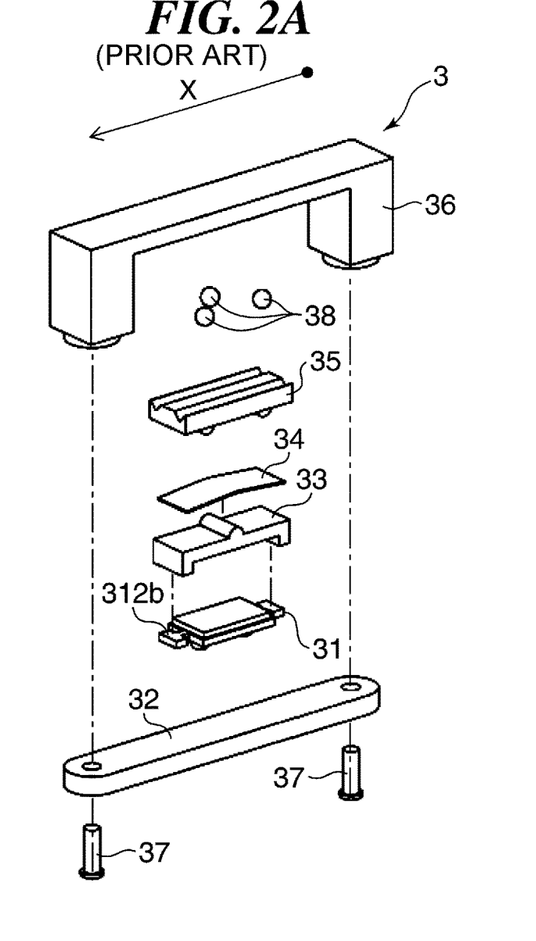
FIGS. 2A to 2D are diagrams useful in explaining a conventional vibration motor.
Figure 2B:
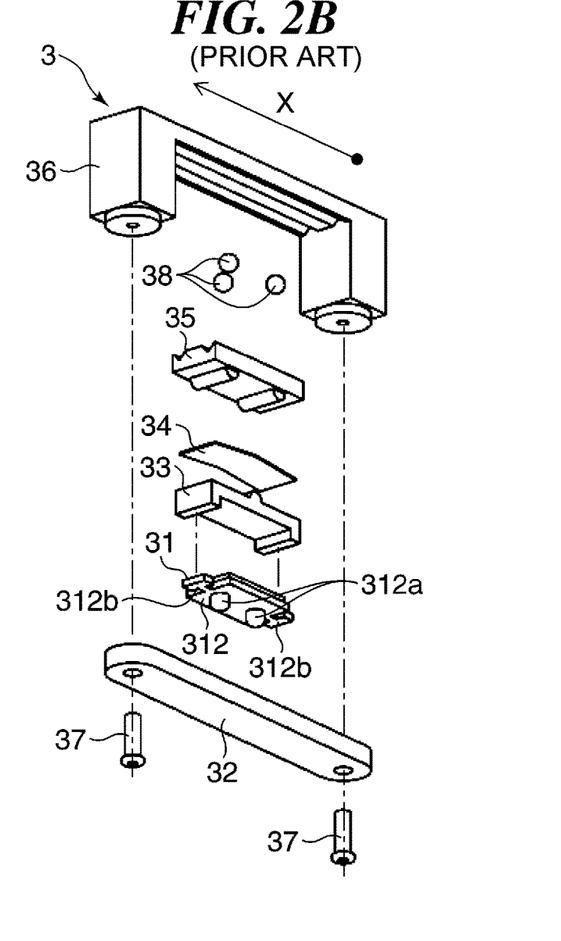
Figure 2C:
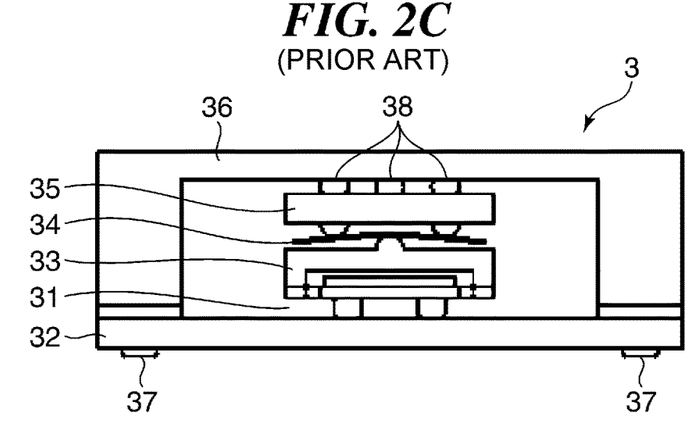
Figure 2D:
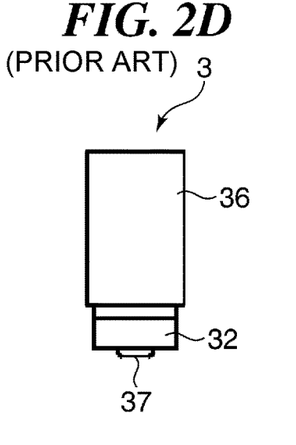

FIGS. 2A to 2D are diagrams useful in explaining a conventional vibration motor. FIG. 2A is an exploded perspective view of the vibration motor, as viewed from one direction, whereas FIG. 2B is an exploded perspective view of the conventional vibration motor, as viewed from another direction. FIG. 2C is a front view of the vibration motor, and FIG. 2D is a side view of the conventional vibration motor.

The illustrated vibration motor, denoted by reference numeral 3, includes a vibrator 31, a friction member 32, a vibrator holding member 33, a pressurizing member 34, a guided member 35, a fixing member 36, fastening members 37, and rolling members 38. The vibration motor 1, shown in FIGS. 1A to 1D, and the vibration motor 3, shown in FIGS. 2A to 2D, are different in the shapes of the contact members 12 and 32, and the shapes of the fixing members 16 and 36, but the other components are similarly configured.

Figure 3A:
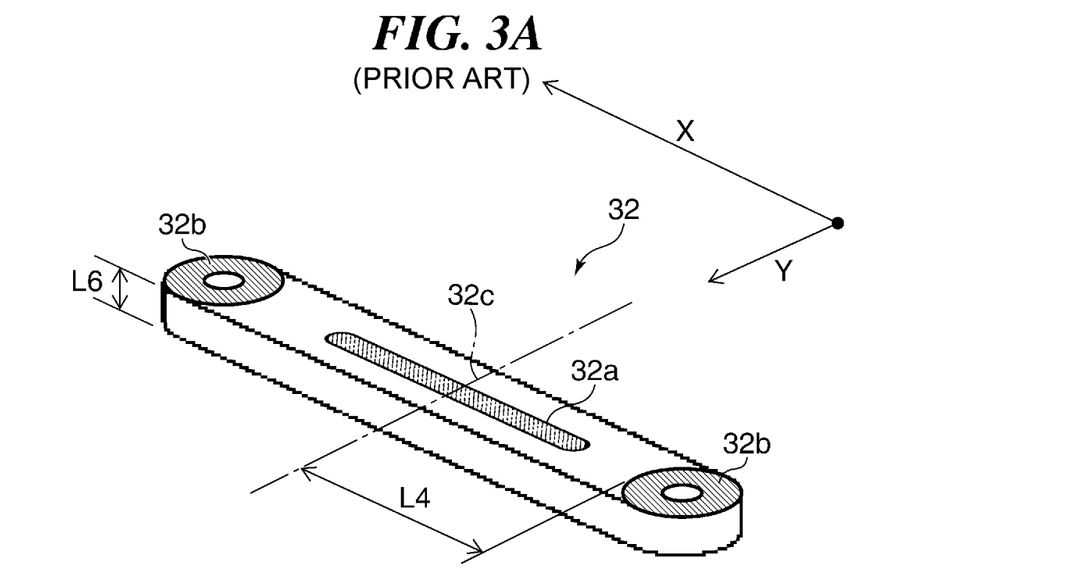
FIGS. 3A and 3B are diagrams useful in explaining the operation of the conventional vibration motor shown in FIGS. 2A to 2D.
Figure 3B:
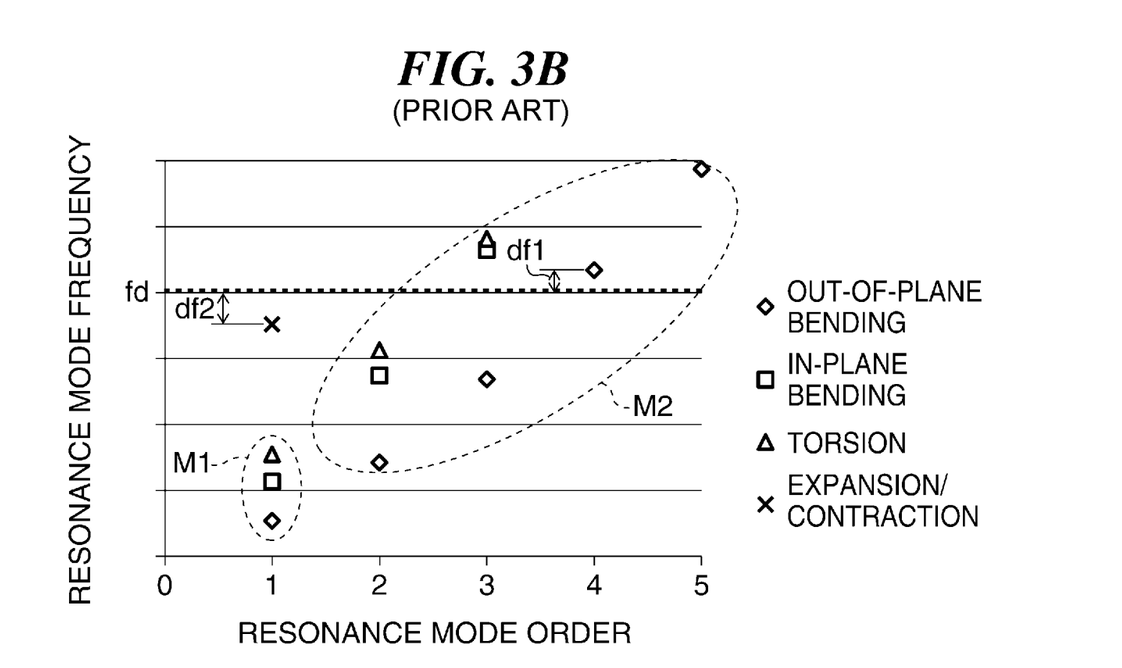

FIGS. 3A and 3B are diagrams useful in explaining the operation of the conventional vibration motor shown in FIGS. 2A to 2D. FIG. 3A is a perspective view showing the shape of the friction member 32, and FIG. 3B is a diagram showing frequency distribution of vibrations in resonance modes of the friction member 32.

In the friction member 32 shown in FIG. 3A, an area in which protrusions 312a are frictionally slid when the vibrator 31 moves is defined as a sliding portion 32a, and surface portions which are in contact with and fixed to the fixing member 36 are defined as fixed portions 32b. In the conventional vibration motor 3, the fixed portions 32b are formed at opposite ends of the friction member 32, where the moving stroke of the vibrator 31 is avoided, and these fixed portions 32b are located remote from each other.

In general, in the shape of a beam or a plate, a portion remote from the fixed portion 32b is more liable to vibrate. Therefore, in FIG. 3A, a portion in and around the center of the friction member 32 (portion corresponding to a one-dot chain line 32c in FIG. 3A), which is remotest from the fixed portions 32b, is most liable to vibrate.

Referring to FIG. 3B, a horizontal axis represents the order of resonance modes, and a vertical axis represents the frequency of the resonance modes. In a predetermined frequency range, the friction member 32 has resonance modes of out-of-plane bending vibration, in-plane bending vibration, torsional vibration, and expansion/contraction vibration.

Figure 4A:
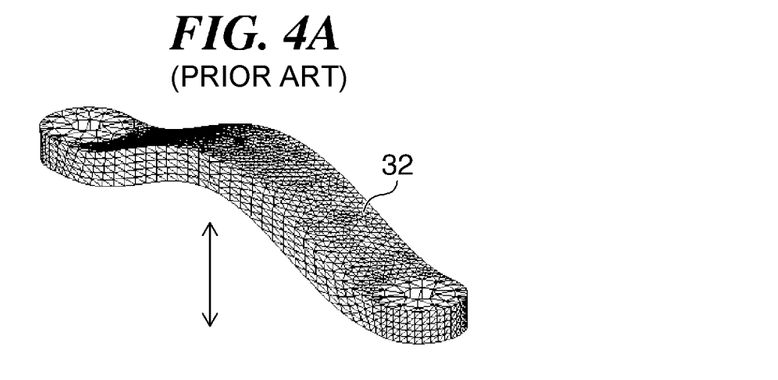
FIGS. 4A to 4C are diagrams useful in explaining shapes of a contact member shown in FIG. 3A in resonance modes.
Figure 4B:
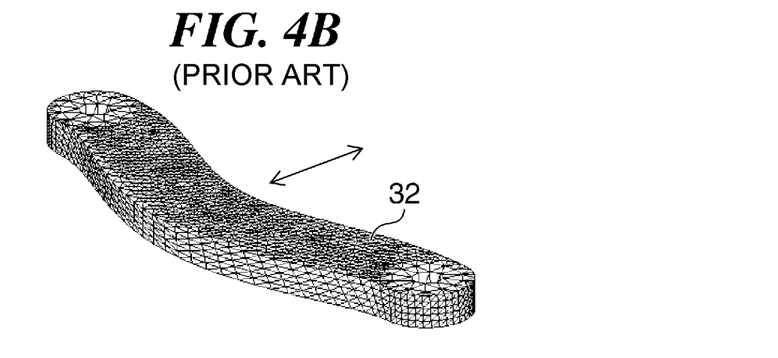
Figure 4C:
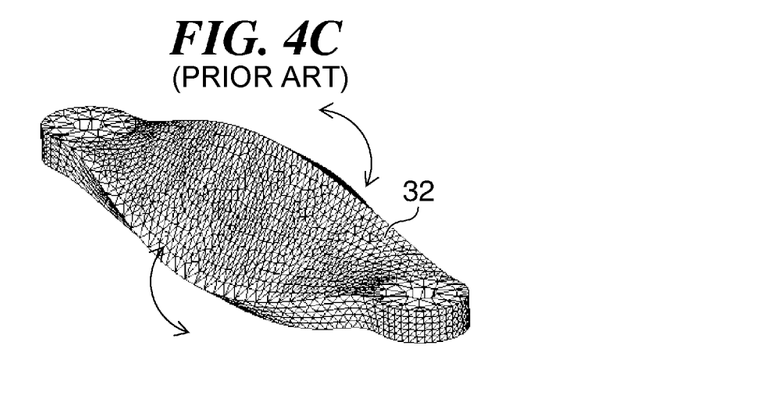

FIGS. 4A to 4C are diagrams useful in explaining shapes of the friction member 32, shown in FIG. 3A, in respective resonance modes. FIG. 4A shows a shape of the friction member 32 deformed by out-of-plane bending vibration in a primary resonance mode thereof, FIG. 4B shows a shape of the friction member 32 deformed by in-plane bending vibration in a primary resonance mode thereof, and FIG. 4C shows a shape of the friction member 32 deformed by torsional vibration in a primary resonance mode thereof.

As mentioned above, since in the friction member 32, the portion in the vicinity of the center, which corresponds to the one-dot chain line 32c, is liable to vibrate, as indicated by M1 in FIG. 3B, the frequencies of the primary resonance modes are low in the respective directions of out-of-plane bending vibration, in-plane bending vibration, and torsional vibration. Further, since the frequencies of the primary resonance mode are low, there are a lot of higher-order resonance modes, as indicated by M2.

Here, let it be assumed that a frequency of a high-frequency voltage applied to the vibrator 31, at which the vibrator 31 vibrates, is defined as a driving frequency fd. It is desirable that the driving frequency fd is not equal to the resonance frequency of the friction member 32. Therefore, the thickness and the width of the friction member 32 having a plurality of resonance modes are strictly designed so as to ensure a frequency difference (df1 and df2) having not less than a predetermined value from the frequency of each resonance mode in the vicinity of the driving frequency fd.

However, if the friction member 32 is designed to be thin in thickness, the resonance frequency becomes low, so that the number of resonance modes is increased as mentioned above. For this reason, it is difficult to reduce the thickness of the friction member 32 while ensuring a frequency difference having not less than the predetermined value from a frequency of each resonance mode in the vicinity of the driving frequency fd. Further, since the fixed portions 32b are formed at the opposite ends of the friction member 32, as shown in FIG. 3A, the whole length of the friction member 32 is increased.

Figure 5A:
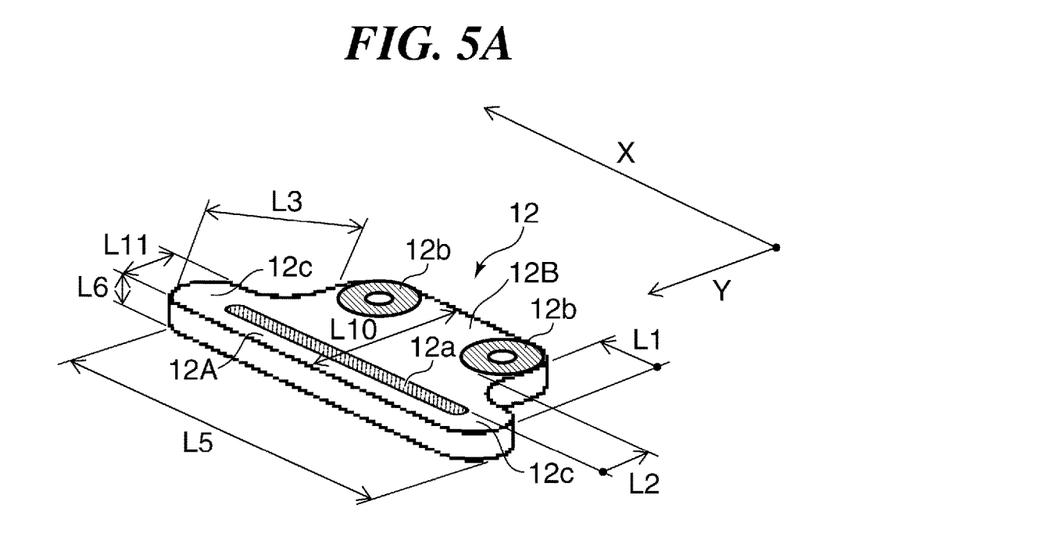
FIGS. 5A and 5B are diagrams useful in explaining the operation of the vibration motor shown in FIGS. 1A to 1D.
Figure 5B:
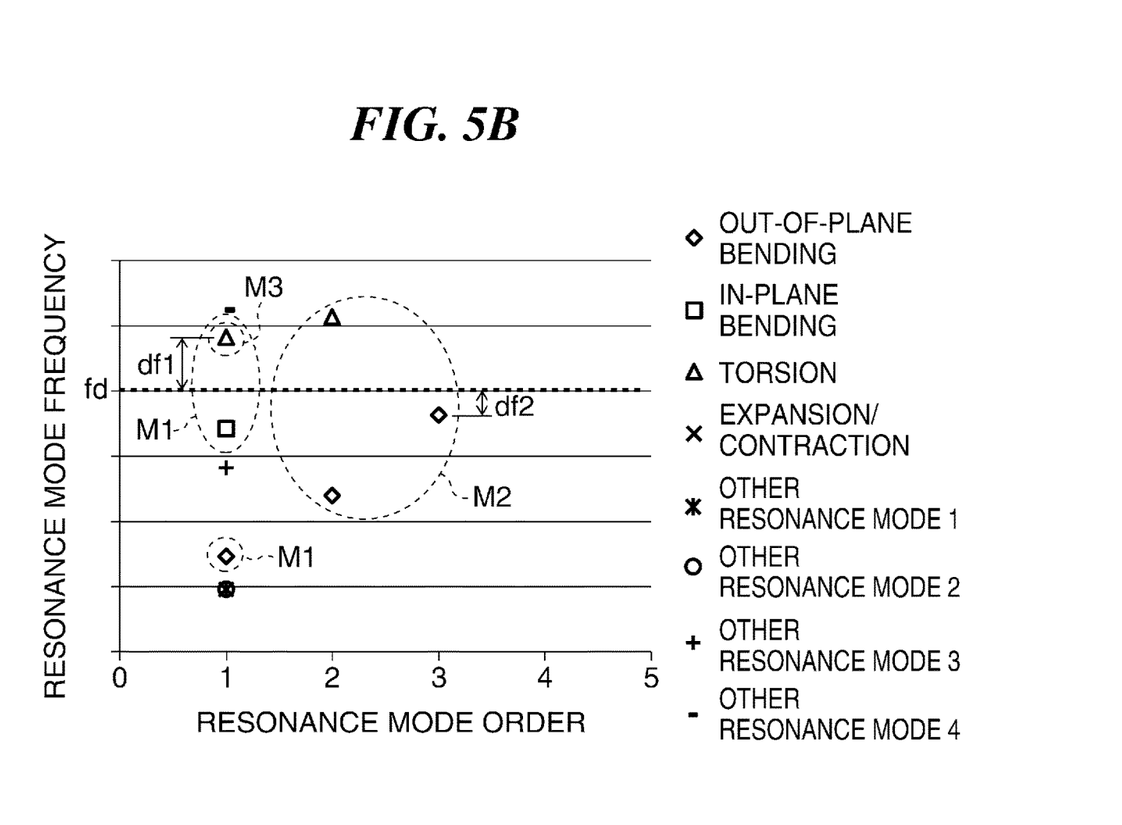

FIGS. 5A and 5B are diagrams useful in explaining the operation of the vibration motor shown in FIGS. 1A to 1D. FIG. 5A is a perspective view showing the shape of the friction member 12, and FIG. 5B is a diagram showing frequency distribution of vibrations in the resonance modes of the friction member 12.

The illustrated friction member 12 includes the first friction area part 12A in which the sliding portion 12a as a sliding area is defined, and the second friction area part 12B in which the fixed portions 12b are defined. The second friction area part 12B is smaller in length in the X direction in FIG. 5A than the first friction area part 12A.

In the present example, the fixed portions 12b are arranged at respective locations inward of opposite ends 12c of the first friction area part 12A by a dimension L1 in the driving direction (X direction in FIG. 5A) of the vibration motor 1. Further, the fixed portions 12b are arranged away from the sliding portion 12a by a dimension L2 in a Y direction (direction orthogonal to the X direction) in FIG. 5A. That is, the fixed portions 12b are arranged at respective locations alongside the sliding portion 12a in the Y direction. Further, each fixed portion 12b is arranged at a location which is closer to the center of the sliding portion 12a in a relative movement direction than the associated end of the sliding portion 12a is.

For example, assuming that a distance between each end 12c of the first friction area part 12A and an end of an associated one of the fixed portions 12b is defined as L3, the distance L3 is shorter than a distance L4 between the center of the friction member 32, which is indicated by the one-dot chain line 32c, and each fixed portion 32b, shown in FIG. 3A.

Referring to FIG. 5B, a horizontal axis represents the order of resonance modes, and a vertical axis represents the frequency of the resonance modes. FIG. 5B shows the resonance modes in the same frequency range as that within which the resonance modes shown in FIG. 3B are.

In the present example, the friction member 12 is designed to be thinner in thickness (indicated by a thickness L6 in FIGS. 3A and 5A) than the friction member 32 by approximately 30%. In the friction member 12, distances from the fixed portions 12b to the other portions of the friction member 12 are smaller than distances from the fixed portions 32b to the other portions of the friction member 32.

For this reason, as indicated by M1 in FIG. 5B, the frequencies of the primary resonance modes are high in out-of-plane bending vibration, in-plane bending vibration, and torsional vibration. Further, since the frequencies of the primary resonance modes are high, the number of the higher-order resonance modes is reduced as indicated by M2.

Figure 6A:
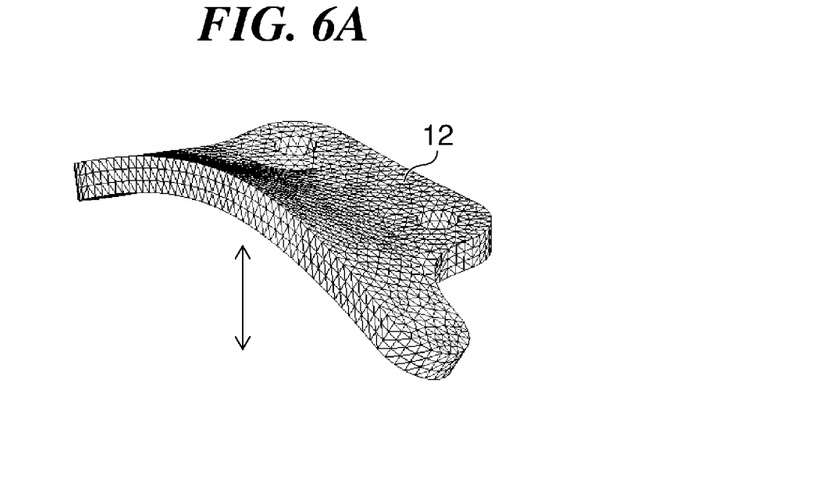
FIGS. 6A to 6C are diagrams useful in explaining shapes of a contact member, shown in FIG. 5A, in resonance modes.
Figure 6B:
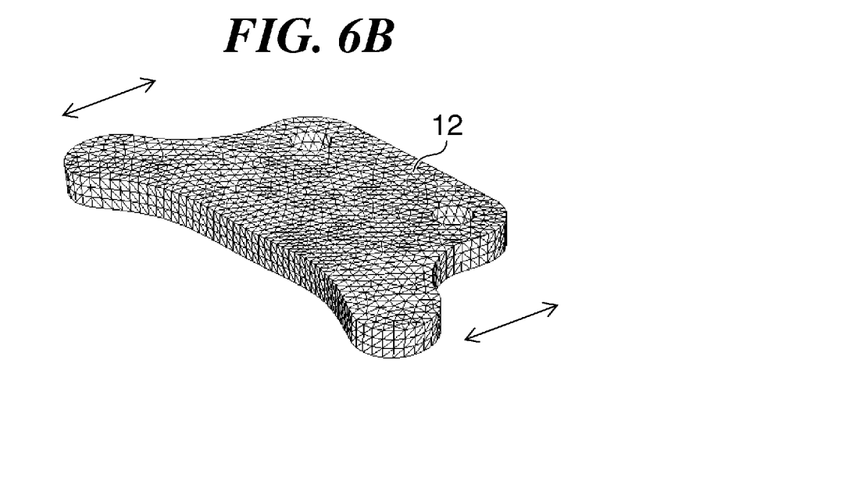
Figure 6C:
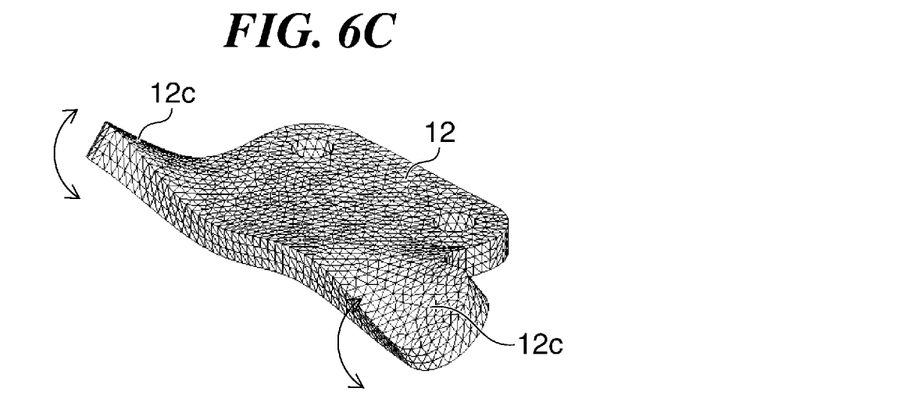

FIGS. 6A to 6C are diagrams useful in explaining shapes of the friction member 12, shown in FIG. 5A, in the respective resonance modes. FIG. 6A shows a shape of the friction member 12 deformed by out-of-plane bending vibration in a primary resonance mode thereof, FIG. 6B shows a shape of the friction member 12 deformed by in-plane bending vibration in a primary resonance mode thereof, and FIG. 6C shows a shape of the friction member 12 deformed by torsional vibration in a primary resonance mode thereof.

The friction member 12 shown in FIG. 5A has a more complicated shape than the friction member 32 shown in FIG. 3A (i.e. does not have a simple shape), and hence the friction member 12 has other resonance modes different from those of out-of-plane bending vibration, in-plane bending vibration, and torsional vibration.

On the other hand, the other resonance modes do not accompany higher-order resonance modes. Further, when the frequency distribution of the resonance modes is compared between the friction member 12 and the friction member 32, it is clear that although the friction member 12 is thinner in thickness, the friction member 12 has a smaller number of resonance modes.

As a result, in the friction member 12, it is possible to make frequency differences (df1 and df2) between the driving frequency fd at which the vibrator 11 is vibrated and frequencies of the resonance modes in the vicinity of the driving frequency fd not smaller than those obtained by the conventional vibration motor 3. Further, in the friction member 12, the fixed portions 12b are not arranged at the opposite ends of the friction member 12 (i.e. opposite ends of the first friction area part), and hence it is possible to reduce the length (length L5 in FIG. 5A) of the friction member 12 in the driving direction (X direction) of the vibration motor 1.

Figure 7A:
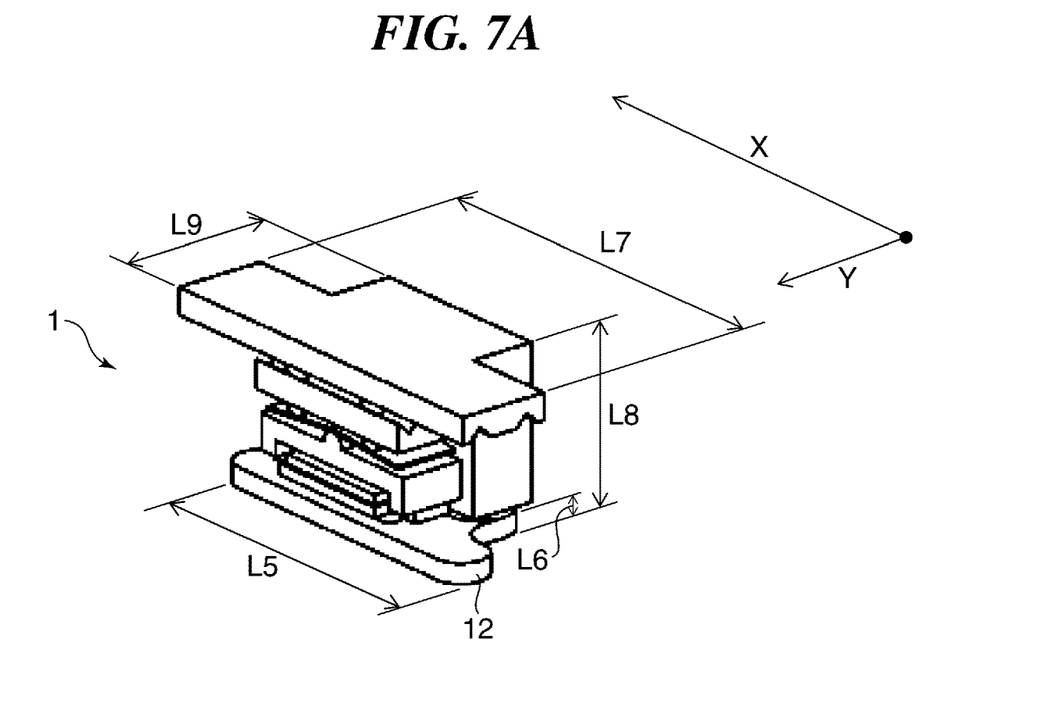
FIGS. 7A and 7B are diagrams useful in explaining advantageous effects obtained by using the vibration motor shown in FIGS. 1A to 1D.
Figure 7B:
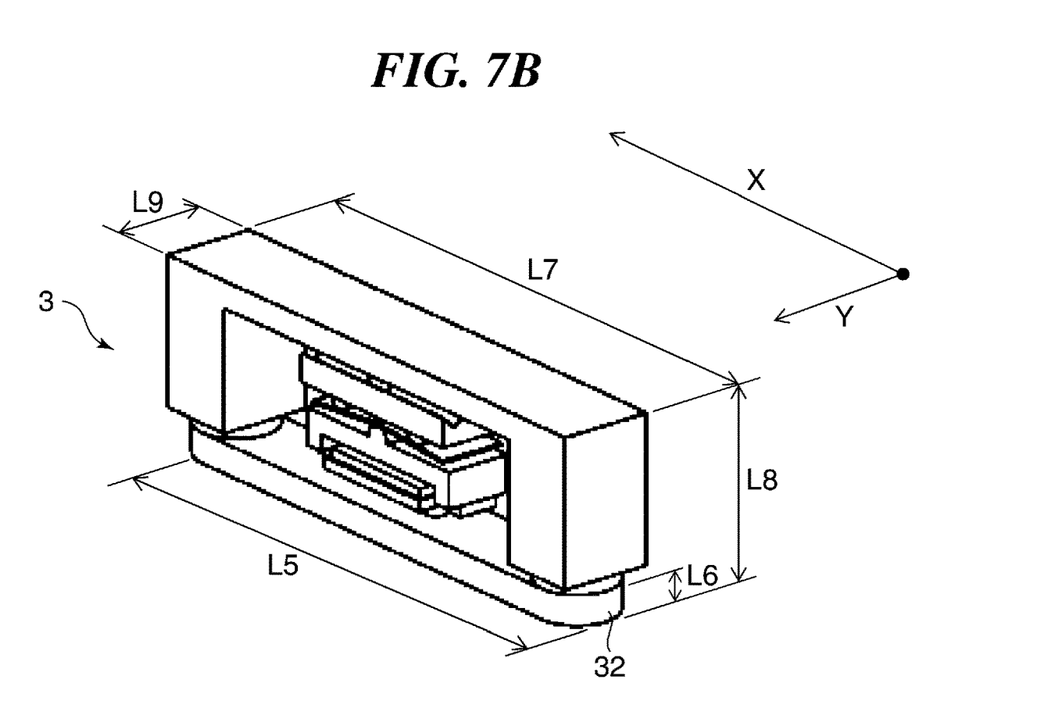

FIGS. 7A and 7B are diagrams useful in explaining advantageous effects obtained by using the vibration motor 1 shown in FIGS. 1A to 1D. FIG. 7A is a perspective view of the vibration motor 1 shown in FIGS. 1A to 1D, and FIG. 7B is a perspective view of the conventional vibration motor 3.

As described above, the friction member 12 used in the vibration motor 1 is smaller in length in the driving direction (X direction) than the friction member 32 used in the conventional vibration motor 3 (see the length L5 in each of FIGS. 7A and 7B). Further, the friction member 12 is smaller in thickness than the friction member 32 (see the thickness L6 in each of FIGS. 7A and 7B).

As a result, the vibration motor 1 is smaller in length in the driving direction (X direction) than the vibration motor 3 (see a length L7 in each of FIGS. 7A and 7B). Further, the vibration motor 1 is smaller in thickness than the vibration motor 3 (see a thickness L8 in each of FIGS. 7A and 7B).

On the other hand, the vibration motor 1 is larger in length in a direction (Y direction in FIGS. 7A and 7B) orthogonal to the driving direction (X direction) and the thickness direction than the conventional vibration motor 3 (see L9 in each of FIGS. 7A and 7B). As described hereinafter, this has little effect on the actual usage.

As described above, in the first embodiment of the present invention, the friction member 12 is formed by the first friction area part 12A in which the sliding portion 12a is defined, and the second friction area part 12B which is integrally formed with the first friction area part 12A and extends in the direction orthogonally crossing the sliding portion 12a, and the length of the second friction area part 12B in the longitudinal direction is made smaller than the length of the first friction area part 12A in the longitudinal direction. Further, the fixed portions 12b are defined in the second friction area part 12B.

This makes it possible to reduce the length of the first friction area part 12A in which the sliding portion 12a is defined to thereby reduce the length of the contact member itself in the longitudinal direction, and in turn reduce the size of the vibration motor.

Here, a description will be given of a structure for obtaining more advantageous effects when the vibration motor 1 shown in FIGS. 1A to 1D is used.

In the friction member 12 shown in FIG. 5A, portions extending outwardly in the driving direction (X direction) are referred to as the extending portions 12c. A primary resonance mode of torsional vibration, indicated by M3 in FIG. 5B, is a resonance mode in which the extending portions 12c are twisted as shown in FIG. 6C. As shown in FIG. 5B, in the friction member 12, the frequency of the resonance mode M3 in which the extending portions 12c are twisted is higher than the driving frequency fd.

As mentioned above, the conventional friction member 32 has a lot of resonance modes in out-of-plane bending vibration, in-plane bending vibration, and torsional vibration. With respect to the resonance modes of which the frequency of the primary resonance mode is lower than the driving frequency fd, it is necessary to design the friction member 32 such that the driving frequency fd is in a gap in the frequency distribution of the plurality of resonance modes including the primary and higher-order resonance modes.

However, it is difficult to arrange the driving frequency fd in a gap in the frequency distribution of resonance modes, for all the resonance modes of out-of-plane bending vibration, in-plane bending vibration, and torsional vibration, which largely reduces the degree of freedom in designing the friction member 32.

On the other hand, as mentioned above, the friction member 12 is relatively high in frequency of the primary resonance mode of torsional vibration. Therefore, if the friction member 12 is designed such that the frequency M3 in the primary resonance mode of torsional vibration is higher than the driving frequency fd, it is no longer necessary to arrange the driving frequency fd in a gap in the frequency distribution of resonance modes, for the resonance mode of torsional vibration.

As a result, the vibration motor 1 is only required to be designed such that the driving frequency fd is in a gap in the frequency distribution of resonance modes, only for the two resonance modes of out-of-plane bending vibration and in-plane bending vibration.

Note that since the vibration motor 1 has an increased degree of freedom of design and the thickness of the friction member 12 can be reduced, it is desirable to make the frequency of the resonance mode of torsional vibration, in which the extending portions 12c are twisted, higher than the driving frequency fd.

Here, in the friction member 12, a direction which is parallel to the surface having the sliding portion 12a formed thereon and is orthogonal to the driving direction (X direction) is defined as the width direction (Y direction). As described above, the friction member 12 includes a plurality of fixed portions 12b, and a length L10 of an area in the width direction (Y direction), which extends between the fixed portions 12b in the driving direction (X direction), is different from a length L11 of each extending portion (end) 12c in the width direction (Y direction).

The frequencies of the resonance modes of out-of-plane bending vibration and in-plane bending vibration are relatively insensitive to a change in the length L11 of each extending portion 12c in the width direction (Y direction), whereas the frequency of the resonance mode of torsional vibration is sensitive. In designing the friction member 12, it is preferable that the frequency M3 of the resonance mode of torsional vibration in which the extending portions 12c are twisted is adjusted independently of the resonance modes of out-of-plane bending vibration and in-plane bending vibration.

For this reason, in the friction member 12, it is desirable to adjust the frequency of the resonance mode of torsional vibration, by making the length L10 of the area in the width direction, which extends between the fixed portions 12b in the driving direction (X direction), different from the length L11 of each extending portion 12c in the width direction.

If the length L10 of the area in the width direction (Y direction), which extends between the fixed portions 12b, is longer than the length L11 of each extending portion 12c in the width direction (Y direction), it is possible to design the friction member 12 such that only the frequency M3 of the resonance mode of torsional vibration, in particular, is selectively made high. Therefore, it is desirable to make the length L10 of the area in the width direction (Y direction), which extends between the fixed portions 12b, longer than the length L11 of each extending portion 12c in the width direction (Y direction).

Although in the above-described vibration motor 1, the description is given of an example in which the friction member 12 is fixed, and the vibrator 11 is moved, the vibrator 11 may be fixed, and the friction member 12 may be moved.

Next, a description will be given of a vibration motor according to a second embodiment of the present invention.

Figure 8A:
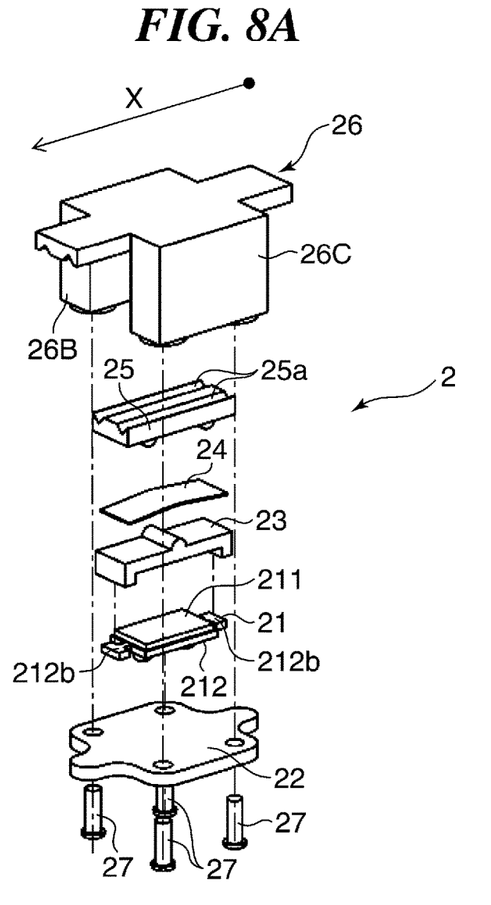
FIGS. 8A to 8D are diagrams useful in explaining a vibration motor according to a second embodiment of the present invention.
Figure 8B:
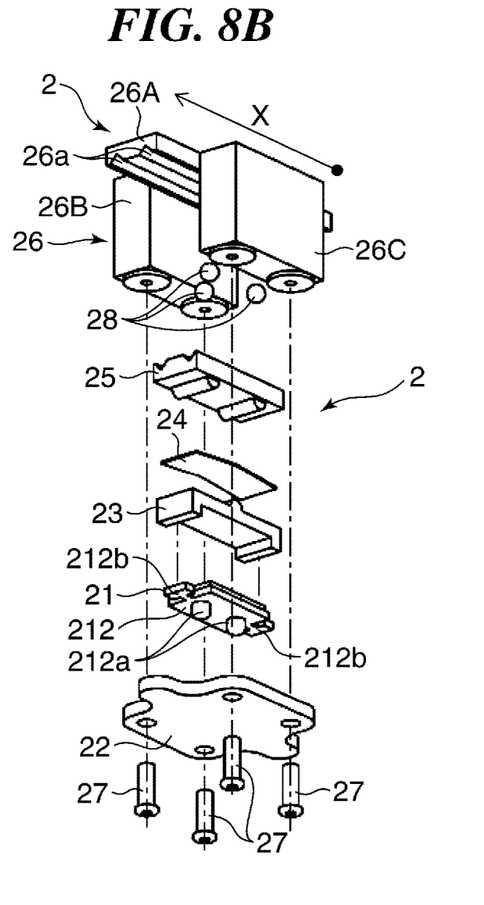
Figure 8C:
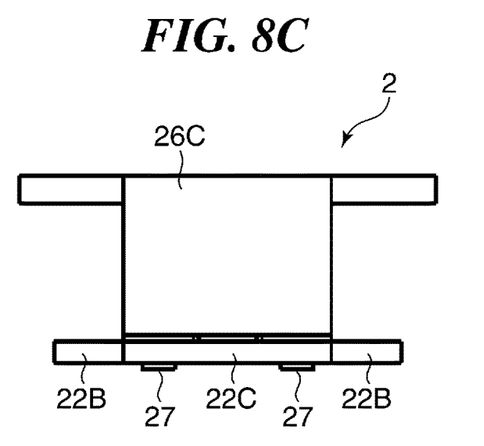
Figure 8D:
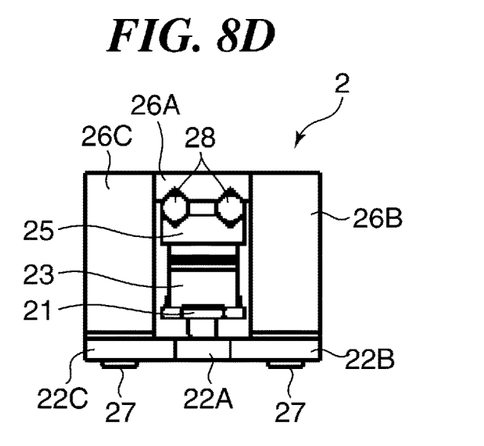

FIGS. 8A to 8D are diagrams useful in explaining the vibration motor according to the second embodiment. FIG. 8A is an exploded perspective view of the vibration motor, as viewed from one direction, whereas FIG. 8B is an exploded perspective view of the vibration motor, as viewed from another direction. FIG. 8C is a front view of the vibration motor, and FIG. 8D is a side view of the vibration motor.

The illustrated vibration motor, denoted by reference numeral 2, includes a vibrator 21, a friction member 22, a vibrator holding member 23, a pressurizing member 24, a guided member 25, a fixing member 26, fastening members 27, and rolling members 28.

The vibrator 21 includes a piezoelectric element 211 having a plate shape, and the piezoelectric element 211 has an elastic member 212, having a plate shape, attached to one surface thereof. Further, as shown in FIG. 8B, the elastic member 212 is formed with two protrusions 212a each protruding downward, and is formed with held portions 212b extending outward from respective opposite side surfaces.

Note that the vibrator 21, the vibrator holding member 23, the pressurizing member 24, and the guided member 25 are configured similar to the vibrator 11, the vibrator holding member 13, the pressurizing member 14, and the guided member 15, appearing in FIGS. 1A to 1D, and the guided member 25 is formed with two guide grooves 25a.

The friction member 22 includes a first friction area part 22A in which a sliding portion 22a, referred to hereinafter, is defined, and second and third friction area parts 22B and 22C, which are integrally formed with the first friction area part 22A. The first friction area part 22A is provided between the second and third friction area parts 22B and 22C. The second and third friction area parts 22B and 22C are each formed with a pair of fixed portions 22b.

The fixing member 26 includes a first fixing area part 26A, and second and third fixing area parts 26B and 26C, which are integrally formed with the first fixing area part 26A. Further, the first fixing area part 26A is formed with two guide grooves 26a extending in the driving direction (X direction) of the vibration motor 1, similar to the guided member 25. Screws as the fastening members 27 are inserted through the fixed portions 22b, whereby the second and third friction area parts 22B and 22C of the friction member 22 are fixed to the second and third fixing area parts 26B and 26C of the fixing member 26.

Note that as shown in FIGS. 8A to 8D, balls as the rolling members 28 are sandwiched between the guide grooves 25a formed in the guided member 25 and the guide grooves 26a formed in the fixing member 26, and the guided member 25 is held in a manner movable only in the driving direction (X direction) with respect to the fixing member 26.

As described above, the vibration motor 2, shown in FIGS. 8A to 8D, differs from the vibration motor 1, shown in FIGS. 1A to 1D, in the shapes of the friction member 22 and the fixing member 26.

Figure 9A:
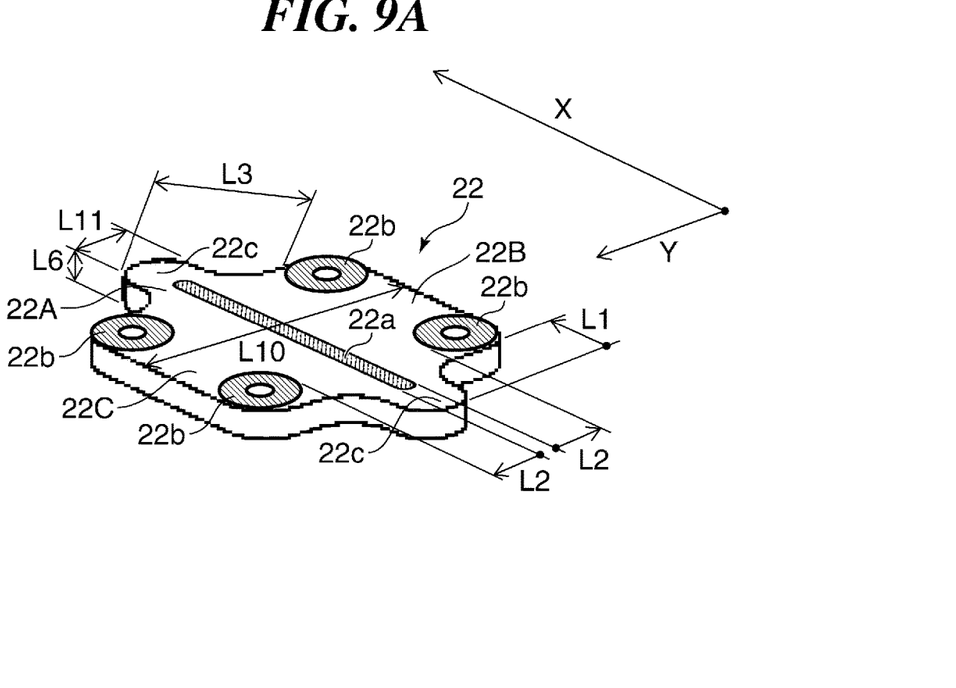
FIGS. 9A and 9B are diagrams useful in explaining the operation of the vibration motor shown in FIGS. 8A to 8D.
Figure 9B:
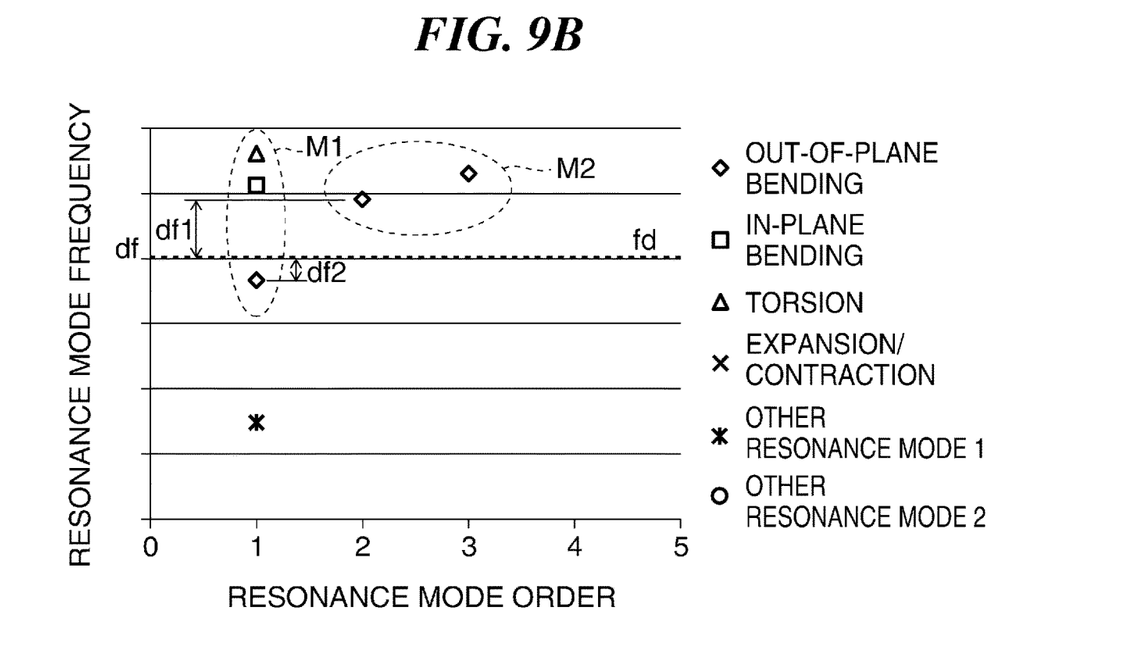

FIGS. 9A and 9B are diagrams useful in explaining the operation of the vibration motor shown in FIGS. 8A to 8D. FIG. 9A is a perspective view showing the shape of the friction member 22, and FIG. 9B is a diagram showing frequency distribution of resonance modes of the friction member 22.

The illustrated friction member 22 includes the first friction area part 22A in which the sliding portion 22a is defined, the second friction area part 22B in which the fixed portions 22b are defined, and the third friction area part 22C in which the fixed portions 22b are defined. The second and third friction area parts 22B and 22C are larger in length in the X direction in FIG. 9A than the first friction area part 22A.

In the present example, the fixing portions 22b defined in the second and third friction area parts 22B and 22C are arranged inward of opposite ends 22c of the first friction area part 22A by the dimension L1 in the driving direction (X direction in FIG. 9A) of the vibration motor 2. Further, the fixed portions 22b defined in the second and third friction area parts 22B and 22C are arranged at respective locations away from the sliding portion 22a, by the dimension L2 in the Y direction in FIG. 9A.

For example, assuming that a distance between each end 22c of the first friction area part 22A and an end of an associated one of the fixed portions 22b is defined as L3, the distance L3 is shorter than the distance L4 between the center of the friction member 32, which is indicated by the one-dot chain line 32c, and each fixed portion 32b, shown in FIG. 3A.

Referring to FIG. 9B, a horizontal axis represents the order of resonance modes, and a vertical axis represents the frequency of the resonance modes. FIG. 9B shows the resonance modes within the same frequency range as that within which the resonance modes shown in FIG. 3B are.

In the present example, the friction member 22 is designed to be thinner in thickness (indicated by the thickness L6 in FIGS. 3A and 9A) than the friction member 32 by approximately 30%. In the friction member 22, distances from the fixed portions 22b to the other portions of the friction member 22 are smaller than those of the friction member 32.

For this reason, as indicated by M1 in FIG. 9B, the frequencies of the primary resonance modes are high in out-of-plane bending vibration, in-plane bending vibration, and torsional vibration. Further, since the frequencies of the primary resonance modes are high, the number of the higher-order resonance modes is reduced as indicated by M2.

Although the friction member 22 also has other resonance modes different from those of out-of-plane bending vibration, in-plane bending vibration, and torsional vibration, the vibration motor 2 is similar to the vibration motor 1 in that the number of resonance modes is smaller as a whole.

Therefore, in the friction member 22, it is possible to make frequency differences (df1 and df2) between the driving frequency fd at which the vibrator 11 is vibrated and frequencies of the resonance modes in the vicinity of the driving frequency fd not smaller than those obtained by the conventional vibration motor 3. Further, in the friction member 22, the fixed portions 12b are not arranged at the opposite ends of the friction member 22 (i.e. opposite ends 22c of the first friction area part), and hence it is possible to reduce the length of the friction member 22 in the driving direction (X direction) of the vibration motor 2.

Further, in the friction member 22 of the present invention, since the fixed portions 22b are not arranged at the opposite ends of the friction member 22, the length of the vibration motor 2 in the driving direction (X direction in FIG. 5A) is reduced.

This makes it possible to reduce the length of the first friction area part 22A in which the sliding portion 22a is defined to thereby reduce the length of the contact member itself in the longitudinal direction, and in turn reduce the size of the vibration motor.

Note that similar to the first embodiment, it is desirable to make the frequency of the resonance mode of torsional vibration, in which the extending portions (ends) 22c are twisted, higher than the driving frequency fd. Further, similar to the first embodiment, it is desirable to make the width L10 longer than the length L11 of each extending portion 22c in the width direction (Y direction). Further, also in the second embodiment, the vibrator 21 may be fixed, and the friction member 22 may be moved.

Here, a description will be given of a lens drive unit as an electronic apparatus using the above-described vibration motor. Although the following description is given of the lens drive unit, denoted by reference numeral 4, which uses the vibration motor 1, the lens drive unit can be also constructed by using the vibration motor 2.

Figure 10A:
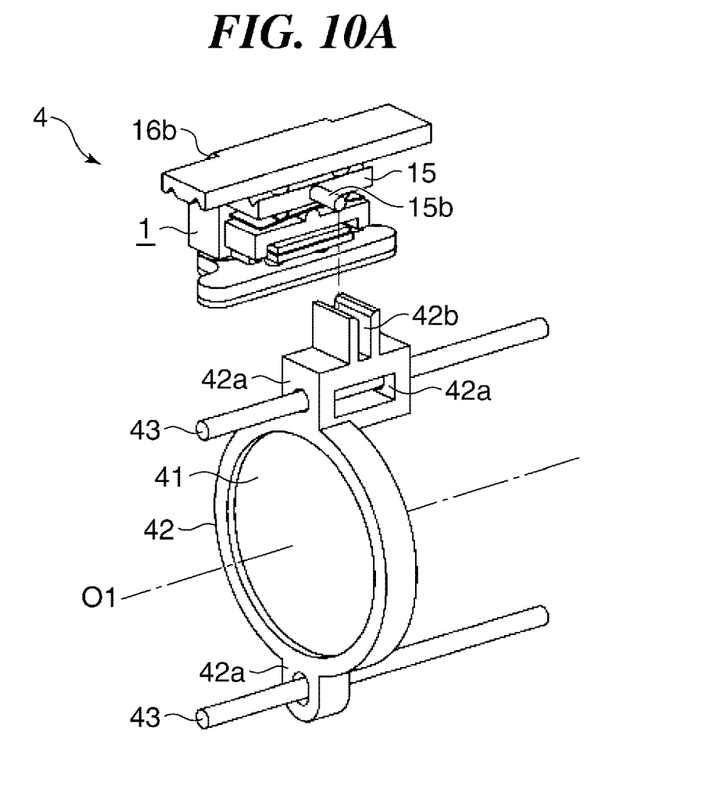
FIGS. 10A to 10C are diagrams useful in explaining a lens drive unit using the vibration motor shown in FIGS. 1A to 1D.
Figure 10B:
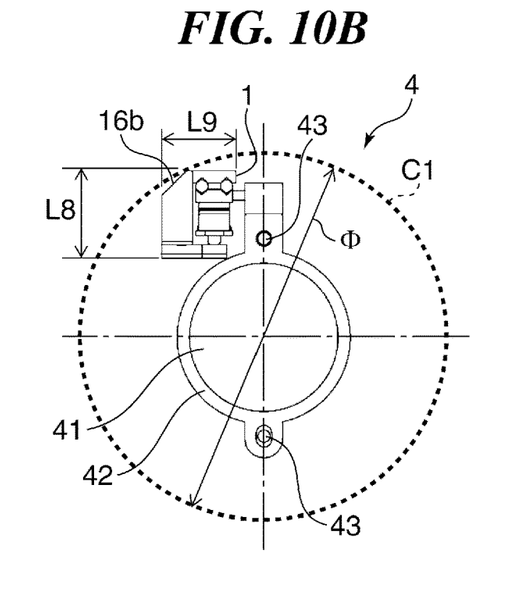
Figure 10C:
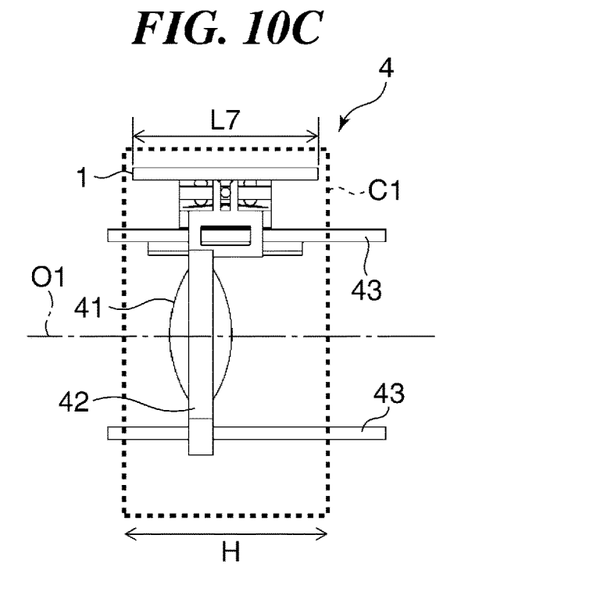

FIGS. 10A to 10C are diagrams useful in explaining the lens drive unit 1 using the vibration motor 1 shown in FIGS. 1A to 1D. FIG. 10A is an exploded perspective view of the lens drive unit 4, FIG. 10B is a front view of the lens drive unit 4, and FIG. 10C is a side view of the lens drive unit.

The lens drive unit 4 includes the above-described vibration motor 1, an optical lens (hereinafter simply referred to as the lens) 41, a lens holding member 42, and guide members 43. The lens 41 is e.g. a focus lens used in a lens barrel of an image pickup apparatus. In the present example, the lens 41 is moved forward and backward along an optical axis (denoted by reference numeral O1 in FIG. 10A) to thereby perform focusing. The lens 41 is held by the lens holding member 42 having a ring shape. Note that the lens 41 and the lens holding member 42 constitute a driven member.

The lens holding member 42 is made of e.g. resin, and has a pair of hole portions 42a formed at respective opposite locations of a periphery thereof. Each guide member 43 is a guide bar e.g. made of metal, and has opposite ends thereof fixed to a casing (not shown). The guide members 43 are inserted through the hole portions 42a, respectively, whereby the lens holding member 42 is guided and held by the guide members 43 in a manner movable along the optical axis O1.

In the illustrated vibration motor 1, the guided member 15 is formed with a protruding portion 15b protruding outward, and further, the fixing member 16 is formed with a chamfered portion 16b. Further, the lens holding member 42 is formed with a groove 42b, and the protruding portion 15b is engaged with the groove 42b.

In the illustrated lens drive unit 4, the lens 41, i.e. the lens holding member 42 is moved forward and backward along the optical axis O1 by driving the vibration motor 1. The vibration motor 1 is smaller in the thickness L8, indicated in FIG. 10B, and the length L7 in the driving direction, indicated in FIG. 10C, than the conventional vibration motor 3.

The lens drive unit 4 is often arranged within a casing having a cylindrical shape, such as a lens barrel. That is, as shown in FIGS. 10A to 10C, the lens drive unit 4 is arranged within the cylinder in the center of which extends the optical axis O1. Now, the cylinder in the center of which extends the optical axis O1 is defined by C1 indicated by a broken line in FIGS. 10B and 10C.

In this case, the thickness L8 of the vibration motor 1 affects a diameter $\Phi$ of the cylinder C1, and the length L7 of the vibration motor 1 in the driving direction affects a length H of the cylinder C1. As for the width L9 of the vibration motor 1, by forming the chamfered portion 16b, it is possible to suppress the width L9 of the vibration motor 1 from affecting the diameter $\Phi$ of the cylinder C1.

As described above, since the vibration motor 1 is reduced in the thickness L8 and the length L7 in the driving direction, it is possible to reduce the size of the cylinder C1 within which the lens drive unit 4 is arranged. That is, by using the vibration motor 1, it is possible to provide a lens drive unit that can be arranged in a small-sized cylindrical lens barrel. Although the description is given of the lens drive unit as an example of the electronic apparatus using the above-described vibration motor, the above-described vibration motor may be used in other electronic apparatuses, such as an image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-203534 filed Oct. 17, 2016, which is hereby incorporated by reference herein in its entirety.

What is claimed is:

1. A vibration motor comprising:
    a vibrator having a piezoelectric element;
    a contact member which is brought into friction contact with the vibrator; and
    a fixing member to which the contact member is fixed, the vibration motor being configured to cause the vibrator and the contact member to move relative to each other in a first predetermined direction, by a high-frequency vibration of the piezoelectric element,
    wherein the contact member comprises:
    a sliding portion which is an area brought into friction contact with the vibrator when the vibrator and the contact member are caused to move relative to each other in the first predetermined direction; and
    a fixed portion via which the contact member is fixed to the fixing member, and
    wherein the fixed portion is formed at a location alongside the sliding portion in a second predetermined direction orthogonal to the first predetermined direction and orthogonal to an extending direction of the area of the contact member brought into friction contact with the vibrator, and also inward of an end of the contact member in the first predetermined direction.

2. The vibration motor according to claim 1, wherein the contact member includes an extending portion extending out in the first predetermined direction, and a resonance frequency of a resonance mode in which the extending portion is twisted is higher than a frequency of AC voltage applied to the vibrator.

3. The vibration motor according to claim 2, wherein the fixed portion is formed as at least two fixed portions, and a width of a portion of the contact member between the two fixed portions in the second predetermined direction is different from a width of the extending portions in the second predetermined direction.

4. The vibration motor according to claim 3, wherein the width of the portion of the contact member between the two fixed portions in the second predetermined direction is larger than the width of the extending portions in the second predetermined direction.

5. The vibration motor according to claim 1, wherein the contact member includes a first friction area part in which the sliding portion is defined and a second friction area part in which the fixed portion is defined, and the second friction area part is smaller in length in the first predetermined direction than the first friction area part.

6. The vibration motor according to claim 1, wherein the contact member includes a first friction area part in which the sliding portion is defined, a second friction area part in which the fixed portion is defined, and a third friction area part in which the fixed portion is defined, and
wherein the first friction area part is provided between the second friction area part and the third friction area part.

7. An electronic apparatus comprising:
a vibration motor; and
a driven member that is driven by driving of the vibration motor,
the vibration motor including a vibrator having a piezoelectric element, a contact member which is brought into friction contact with the vibrator, and a fixing member to which the contact member is fixed, the vibration motor causing the vibrator and the contact member to move relative to each other in a first predetermined direction, by high-frequency vibration of the piezoelectric element,
wherein the contact member includes:
a sliding portion which is an area brought into friction contact with the vibrator when the vibrator and the contact member are caused to move relative to each other in the first predetermined direction; and
a fixed portion via which the contact member is fixed to the fixing member, and
wherein the fixed portion is formed at a location alongside the sliding portion in a second predetermined direction orthogonal to the first predetermined direction and orthogonal to an extending direction of the area of the contact member brought into friction contact with the vibrator, and also inward of an end of the contact member in the first predetermined direction.

8. The electronic apparatus according to claim 7, wherein the driven member is an optical lens.

* * * * *